United States Patent [19]
Jortikka et al.

[11] Patent Number: 4,676,826
[45] Date of Patent: Jun. 30, 1987

[54] METHOD AND APPARATUS FOR PNEUMATIC FEEDING OR ADDITIVES INTO CONVERTERS

[76] Inventors: Markku J. Jortikka, Peltokatu 10; Eino H. Forss, Ainonkatu 4; Harry A. Heino, Santakuja 4 C 2, all of SF-29200 Harjavalta; Erkki A. Lajunen, Lammainen, SF-29250 Nakkila; Erkki E. Putkonen, Pakkisenkatu 3; Toivo E. Julkunen, Rysäkuja 4, both of SF-29200 Harjavalta; Timo Laurio, SF-63100 Kuortane, all of Finland

[21] Appl. No.: 833,590

[22] Filed: Feb. 24, 1986

Related U.S. Application Data

[63] Continuation-in-part of Ser. No. 437,948, Nov. 1, 1982, abandoned.

[30] Foreign Application Priority Data

Nov. 17, 1981 [FI] Finland .................................. 813640

[51] Int. Cl.⁴ .............................................. C21C 5/38
[52] U.S. Cl. ......................................... 75/51.1; 75/58; 266/82; 406/124; 406/168
[58] Field of Search .................................. 406/24–25, 406/93–95, 124–126, 32, 168; 266/83, 81–82, 216, 266; 75/58, 130 B, 51.5; 48/86 R

[56] References Cited

U.S. PATENT DOCUMENTS

| | | | |
|---|---|---|---|
| 3,345,055 | 10/1967 | Kutscher et al. | 266/216 X |
| 3,689,045 | 9/1972 | Coulter et al. | 266/82 |
| 3,884,453 | 5/1975 | Pearce et al. | 266/83 |
| 4,005,908 | 2/1977 | Freeman | 406/25 |
| 4,286,774 | 9/1981 | Benatar | 266/82 |

FOREIGN PATENT DOCUMENTS

| | | | |
|---|---|---|---|
| 1292682 | 4/1967 | Fed. Rep. of Germany . | |
| 1608619 | 9/1969 | Fed. Rep. of Germany . | |
| 373174 | 9/1976 | Finland . | |
| 612038 | 10/1926 | France | 406/25 |
| 21222 | 2/1981 | France | 406/25 |
| 10640674 | 10/1974 | Japan . | |
| 498676 | 2/1976 | Japan . | |

OTHER PUBLICATIONS

Technology and Metallurgy of the Olp Process, by B. Trentini, P. Vayssiere, and C. Roederer, 8-1962.

*Primary Examiner*—Jeffrey V. Nase
*Attorney, Agent, or Firm*—Ladas & Parry

[57] ABSTRACT

A method and apparatus for pneumatic feeding of additives along pipes from an additive silo to converters. The additive is allowed to flow into a dispatching device, a scale or a similar device in it stopping the entrance of the additive when the desired quantity of additive has arrived in the dispatching device. The dispatching device is pressurized thereafter by means of compressed air, by means of which the quantity of additive is fed via a pipe into the converters.

4 Claims, 2 Drawing Figures

METHOD AND APPARATUS FOR PNEUMATIC FEEDING OR ADDITIVES INTO CONVERTERS This is a continuation-in-part application of Ser. No. 437,948, filed Nov. 1, 1982 which is currently abandoned.

BACKGROUND OF THE INVENTION

1. Field of the Invention

The present invention relates to a method and apparatus for pneumatic feeding of additives into converters. It relates in particular to a method and apparatus in which the feeding takes place sequentially during the gas-blasting stage of converters.

2. Description of the Prior Art

In conventional systems, additives are conveyed by means of, for example, belt conveyors, which are, however, highly space-consuming structures, and also it is impossible to connect a belt conveyor hermetically to a converter. A pneumatic system is used for continuous conveying of additives into converters, which is a very easy procedure, since in this case the same pressure can be used continuously for a steady feeding of the additive. In the event that non-continuous, sequential feeding is desired, difficulties are encountered, since the feeding pressure must be proportioned among the different feeding sequences according to the type and quantity of the material.

SUMMARY OF THE INVENTION

The object of the present invention is to eliminate the disadvantages of the systems described above and to provide a steady feeding of additives into a converter when the feeding is carried out as a non-continuous measure. According to the invention, it is possible to take into account the type and quantity of the material, in which case the pneumatic feeding pressure is generated in such a way that they are taken into account. Futhermore, the apparatus according to the invention requires little space and is therefore easy to place in the immediate vicinity of converters. An important object of the present invention is to create a safe and hazzard free environment for the workers, wherein the feeding of the additives is carried out during gas blasting, without the risk of gas escaping into the work area.

BRIEF DESCRIPTION OF THE DRAWING

The invention is described below in greater detail with reference to the accompanying drawing, which depicts the principle of the apparatus according to the invention.

DESCRIPTION OF THE PREFERRED EMBODIMENT

Figure 1:
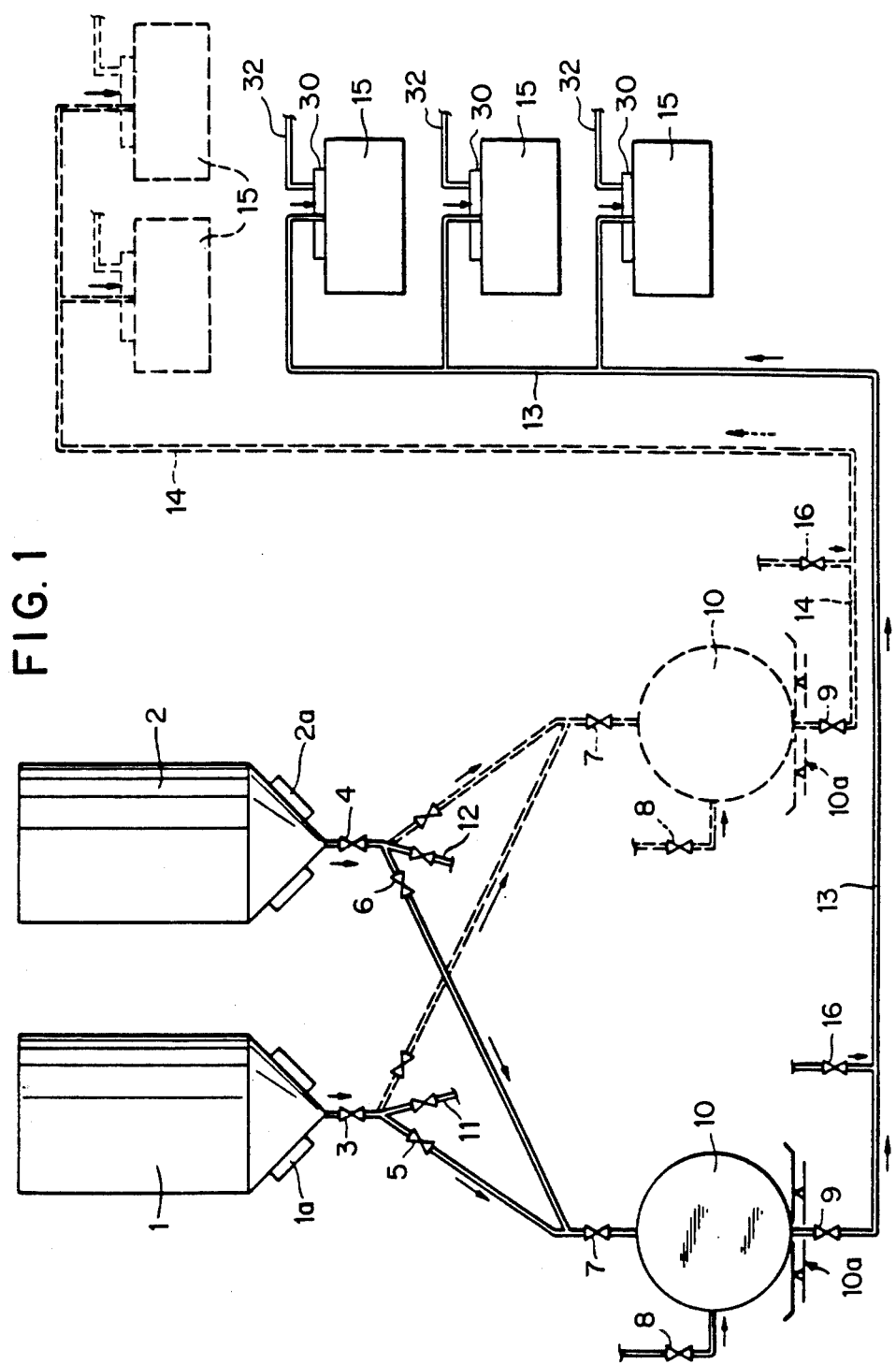
FIG. 1 shows the general arrangement of the apparatus according to the invention.

The main operational principle of the apparatus according to the invention is as follows: The additive or additives is/are situated in silos 1 and 2, of which there can be the required number, i.e. usually each silo contains a different type of additive. Preferably there are vibration motors 1a, resp. 2a connected to the silos, and by means of these motors the disturbance-free forward passage of the additives is secured also under circumstances in which disturbances are to be feared in the feeding. Another part essential for the operation of the apparatus is the dispatching device 10, which in this case means a device in which the required batch of an additive is collected and in which the batch is kept until it is necessary to convey the additive batch to the converters 15.

In addition to the silos 1, 2, the dispatching device 10 and the converters 15, the system includes in principle only two kinds of parts, one kind being pipes 13, 14 for conveying the additives to the converters 15 and the other kind being valves, the operation of which is described below. When the filling of the dispatching device may begin, the valve 7 in the immediate vicinity of the dispatching device is first opened. The valve 7 has a control device which operates only after receiving indication that the valve 7 is completely open. At that time the control device gives the valve 5 a signal to open, and the valve 5, for its part, guides the valve 3 to open after it has itself first opened. Thus, there is a channel open between the additive silo 1 and the dispatching device 10, and the additive begins to flow into the dispatching device along this channel. As mentioned above, the steady flow is promoted by means of a vibration motor.

If the desired additive had been in the silo 2, the valve 6 would have been opened after the valve 7, and thereafter the valve 4. Thus there would have been opened a channel between the dispatching device 10 and the silo 2, and the additive from the silo 2 would have begun to flow into the dispatching device.

The dispatching device 10 includes a scale 10a or some other similar device for sensing the quantity of the additive. When the sensing device indicates that the desired quatity of the additive has flown into the dispatching device, the valve 3 closes and stops the feeding of the material into the pipe. The vibration motor, of course, also stops at this time. After the valve 3, the valves 5 and 7 also close. After the valve 7 has closed, the dispatching unit is completely isolated from its surroundings, since the valves 8 and 9 are also closed. Thus, the raising of the pressure of the dispatching unit 10 is started by opening the valve 8, through which compressed air flows into the dispatching device, until a sufficient pressure is reached for forming a fluidized bed between the compressed air and the additive. When the pressure has risen to a suitable level, the valve 9 is opened, whereupon the pressure and the additive discharge into the pipe 13 and from there on into the converters 15. If necessary, additional compressed air is fed into the pipe 13 via the valve 16. Additional feeding of compressed air is used, for example, when the feeding of the additive does not take place at a steady speed, in which case the additional air accelerates the feeding. In the place of the valves 5 and 6, also triple valves can be used, by means of which the flow of additive can be suitably adjusted to flow along the pipe 11 respectively 12, when the dispatching device or devices is/are not in use.

When one feeding sequence has been completed and a suitable quantity of additive has been fed into the converter, the feeding valve 9 is closed, and also the air valves 8 and 16, if they are open, are closed, and the feeding of a new batch of additive into the dispatching device 10 is started in the order described above. As an aid in determining whether all of the additive has left the dispatching device 10, the scale or the similar device included in the dispatching device is again used; it indicates when the dispatching device 10 has been completely emptied.

Figure 2:
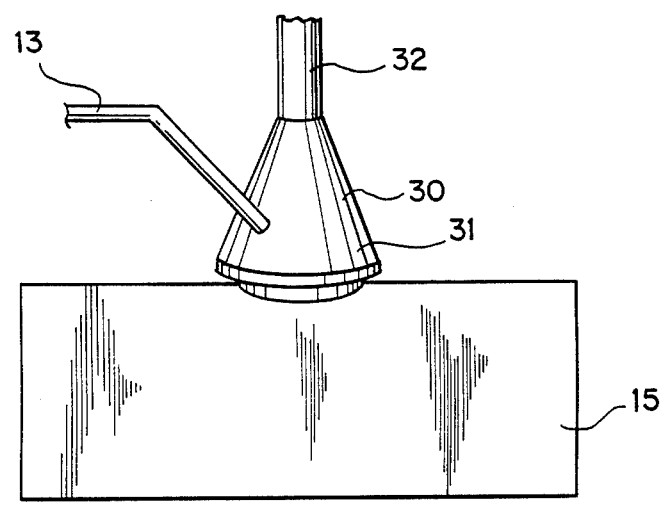
FIG. 2 shows the gas-removal device attached to the converter.

It is shown in FIG. 2, drawn in dotted lines, another dispatching device 10, which for its part can also be used in parallel with the dispatching device 10 drawn in solid lines, or also alone, for example, when the latter device is being serviced, etc. The feeding conduit from the device 10 drawn in dotted lines to the converters 15 is indicated by reference numeral 14. The operation of the system corresponds fully to the operation of the system shown in solid lines. Two dispatching devices is no maximum number, but an arbitrary number of devices can be used, in accordance with the requirements of each process.

Since, for reasons of process technology, there are usually several converters operating in parallel, the apparatus according to the invention further includes a member, not shown in FIG. 1, namely a member which selects the converter into which the additive is to be fed. The feeding conduits 13 and 14 branch out at a point prior to the converters into branches, each leading to one converter. One conventional system for selecting the desired converter is to close those converters into which additive is not to be fed, for example, by means of a flap system. Thus, the additive is directed to the right converter. Connecting the flap control to the system itself is no problem for a person skilled in the art, and modern advanced process control offers excellent possibilities for this, as well as for precise and rational control of the entire process according to the invention.

The feeding pipes 13 and 14 are connected to the converters hermetically also owing to current strict work safety regulations, although the tightness of the mounting also promotes disturbance-free operation of the entire system. The pipes 13 and 14 are attached to the gas-removal devices 20 of the converter and oriented towards the mouth of the converter, in which case the feeding of the additives can be suitably carried out during gas blasting, without the risk of gas escaping into the work area.

The present invention relates to a process and apparatus for pneumatic feeding of additives into converters, especially when the feeding takes place sequentially during the gas-blasting stage of the converters. The additives which are usually sand or coke have a specific weight considerably heavier than that of air. For this reason they can be rather easily separated from the gas when the mixture of additive and pressure air comes out from the conduits conveying it. According to the invention this can take place preferably after the conduits attached to the gas-removal device.

It is shown in FIG. 2 that the gas-removal device 30 attached to the converters consists of a hood formed above the mouth of the converter and of the discharge conduits attached to this hood. The hood 31 extends preferably to the edges of the mouth of the converter and in some degree also outside the edges of the mouth. This is necessary to prevent the gas from escaping outside the converter as effectively as possible. The discharge conduit 32 is attached to the tapered upper part of the hood 31 so that the system becomes entirely tight. In general the area of the converter mouths are some square meters. For this reason, the attaching of the pneumatic feeding pipe for additives to the gas-removal devices of the converter according to the application takes place preferably by attaching the feed pipe to the edge part of the hood. The different components of the additive feeding composition, the additive itself and the pneumatic conveying gas, have thus plenty of space for separating them from each other before the additive is mixed with the converter melt. The feeding pipe for additives according to the invention has a cross section which is smaller than the cross section of the hood of the gas-removal device. The gas amount used in connection with the additives is smaller than the total gas amount to be fed into the converter.

FIG. 2 shows the feeding conduit 13 entering the converter 15 through the gas removal device 30. During operation of the device the flow of a gas-additives mixture enters into the converter and the gas removal device through the conduit 14 or 13. Upon entrance the gas-additives mixture faces a flow of the oppositely directed blasting gases discharged from the converter by the gas removal device through the conduit 32. Such arrangement in addition to other advantages enables the invention to better dispurse the additives within the gas-additives mixture entering the converter.

The method and apparatus according to the invention enable an easy and pricise control of the feeding rate to be effected, since the type of the additive can be taken into consideration by increasing, or respectively decreasing, the pressure to be let into the dispatching device. Since it is advantageous for the control and regulation of the conversion process itself that the additives are fed in each case in a similar manner, the method and apparatus according to the invention are a clear improvement in the art. Stable conversion conditions for their part produce purer wastes and higher-grade valuable materials. Also, when the same dispatching device batches two or more different additives, it is easy to adjust the feeding rate of the additives to a level suitable for each additive, for example by pressure setting on the basis of experimental data.

What is claimed is:

1. A method for pneumatic feeding of additives from an additive silo into converters, comprising
   feeding said additives into a dispatching device having quantity sensing means and means for stopping of a flow of said additives into said dispatching device upon entering a predetermined quantity of said additives into said dispatching device;
   pressurizing the dispatching device by means of compressed air;
   supplying additional compressed air through valve means situated between said dispatching device and said converters;
   entering of a flow of a gas-additives mixture into the converters through gas-removal devices in a such way that said flow faces a flow of oppositively directed blasting gases discharged by said gas-removal devices; and
   removing of said compressed air from said gas-additives mixture along with said blasting gases in said gas-removal devices.

2. A method according to claim 1 in which said flow of a gas-additives mixture enters the converters through gas-removal devices positioned at a mouth of the converters.

3. A method according to claim 1, in which the device for sensing the quantity of the additives is a scale.

4. A method according to claim 1, in which a separate silo and also a separate dispatching device is used for each additive.

* * * * *

UNITED STATES PATENT AND TRADEMARK OFFICE
CERTIFICATE OF CORRECTION

PATENT NO. : 4676826

DATED : June 30, 1987

INVENTOR(S) : JORTIKKA, Markku Juhani et al

It is certified that error appears in the above-identified patent and that said Letters Patent is hereby corrected as shown below:

```
    Title page, Item (54) line 2 reads " or "
    should read --of--,

Column 2, Item 56 line 13 which reads "2/1981 France"
    should read --2/1981 EPA--"

Column 4, line 52
    " oppositively "should read --oppositely--.
```

Signed and Sealed this

Eighteenth Day of October, 1988

Attest:

DONALD J. QUIGG

*Attesting Officer*  *Commissioner of Patents and Trademarks*